(12) United States Patent
Leupold

(10) Patent No.: US 6,445,130 B1
(45) Date of Patent: Sep. 3, 2002

(54) AXIALLY POLARIZED RADIATION FROM A TOROIDAL MAGNETIC STRUCTURE WITH AN EQUATORIAL SLOT

(75) Inventor: Herbert A. Leupold, Eatontown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/346,760

(22) Filed: Jul. 1, 1999

(51) Int. Cl.$^7$ .............................. H01J 25/00; H01F 7/02
(52) U.S. Cl. ..................... 315/4; 315/5.35; 335/306; 372/2; 372/37
(58) Field of Search ............................ 315/4, 5, 5.35; 372/2, 37; 335/306

(56) References Cited

U.S. PATENT DOCUMENTS

| | | | |
|---|---|---|---|
| 5,491,459 A | * | 2/1996 | Leupold ............... 315/5.35 X |
| 5,666,098 A | | 9/1997 | Leupold |
| 5,705,064 A | | 1/1998 | Leupold |
| 5,719,469 A | | 2/1998 | Leupold |
| 5,723,949 A | | 3/1998 | Leupold |

OTHER PUBLICATIONS

Herbert A. Leupold et al., "Circular Free–Electron Laser Structures," Journal of Applied Physics, vol. 81, No. 8, p. 5144 (Apr. 1997).

Herbert A. Leupold et al., "Toroidal Electron Beam Radiation Sources," Transactions IEEE Magnetics 33, No. 5, p. 3418 (1997).

* cited by examiner

Primary Examiner—Benny T. Lee
(74) Attorney, Agent, or Firm—Michael Zelenka; George B. Tereschuk

(57) ABSTRACT

A toroidal magnet structure for polarizing a magnetic wiggler and a synchrotron normal is provided. This structure comprises a toroid composed of a plurality of magic ring semicircular segments, with an equatorial slot extending about a periphery of the toroid. The toroid further comprises a central hollow core and a toroidal axis perpendicular to the toroid. The magic ring semicircular segments are wedge-shaped to prevent magnetic flux leakage between segments and to form a continuous toroid. The equatorial slot allows emission of radiation outside the toroid. An electron beam means injects an electron beam into the central hollow core. The magnetic field thus created has a vertical component $B_v$ within the central hollow core and a periodic horizontal component $B_h$, alternating in direction from ring to ring. The vertical component $B_v$ keeps the electron beam in a generally circular electron path around the toroid and is constant along the entire path. The periodic horizontal component $B_h$ alternates in direction and, due to its periodicity, results in a vertical oscillation of the electron beam thereby giving rise to the wiggler radiation that is polarized vertically.

18 Claims, 4 Drawing Sheets

ELECTRON BEAM

AXIALLY POLARIZED RADIATION FROM A TOROIDAL MAGNETIC STRUCTURE WITH AN EQUATORIAL SLOT

GOVERNMENT INTEREST

The invention described herein may be manufactured, used and licensed by or for the Government of the United States of America, without the payment to me of any royalties thereon.

BACKGROUND OF THE INVENTION

1. Field of the Invention

The present invention relates in general to permanent magnet structures and more particularly to magnet structures providing a guidance mechanism in a Free Electron Laser for continuous high energy and high frequency radiation.

2. Description of the Prior Art

Magnetic fields are commonly used in the operation of numerous electronic devices, including those that accelerate and focus electrons in a free electron laser. A free electron laser typically has a passageway, which is often an excavated cylindrical space, through which an electron beam can pass and made to oscillate in a direction perpendicular to its translation velocity. The bar magnet array produces a field which alternates in the directions shown by the large arrows in FIG. 1, because the magnetization of the individual magnets reverses its direction from magnet to magnet, as indicated by the small arrows in FIG. 1. This causes an electron beam passing axially along the array to wiggle in a direction perpendicular to both the translational, or axial, velocity and the field direction in accordance with elementary electromagnetic theory. This wiggle constitutes an acceleration and an acceleration of an electric charge causes radiation, which in this case is propagated substantially in the axial direction and is polarized in a mutual plane of the wiggle motion and the axial velocity shown in FIG. 1.

In such an arrangement, the electron beam makes only one pass through the magnetic "wiggle" array and much of the electron beam energy is typically wasted. Recently, other techniques for circular wigglers have been produced in which the electron beam can make multiple passes through the periodic magnet array. These prior art concepts are disclosed in U.S. Pat. No. 5,723,949, 5,719,469, 5,705,064 and 5,666,098. These prior art concepts are also exemplified in these publications: Herbert A. Leupold, Ernest Potenziani II. and Anu S. Tilak, "Circular Free-Electron Laser Structures," Journal of Applied Physics, Volume 81, No. 8, p. 5144 (April 1997); and also Herbert A. Leupold, Anu S. Tilak and Ernest Potenziani II, "Toroidal Electron Beam Radiation Sources," Transactions IEEE Magnetics 33, No. 5, p. 3418 (1997).

All of these circular free electron lasers emit synchrotron, as well as, wiggler radiation, in which the frequency of the wiggler radiation is N times the frequency of the synchrotron radiation, where N is the number of magnet periods in a circuit. The two types of radiation are emitted tangentially from the circular beam and are polarized in the plane of the electron beam circulation. It is often desirable to have a monochromatic radiation beam and therefore eliminate the synchrotron component of radiation. Separation of the two components is easier if the polarizations are normal to each other, in which case, one component or the other can be eliminated by various polarization devices. It is the purpose of the present invention to produce a circular-beam free electron laser in which the emitted synchrotron and wiggler radiations are normal to each other.

In the prior art magnetic structures, the circulation of the electron beam itself produces synchrotron radiation, i.e. radiation emanating from a centripetal acceleration wherein the charged particle's velocity changes direction. Referring now to the FIGS. 2A and 2B prior art toroid, FIG. 2A depicts an expanded view of toroid 10 with its iron core slotted to form an azimuthal array of iron teeth 11. The structure's electron path is indicated by arrow 12, the magnetic flux path is indicated by arrow 13 and small arrows 14 depict the magnetization of the permanent magnet toroidal shell.

The iron teeth 11 in toroid structure 10 cause a radial oscillation of the electron beam because of the periodicity of the field strength that is engendered by the periodicity of the iron, namely the sequence of alternate teeth 11 and gaps. Arrows 15 show the direction of the acceleration of the electron beam in the radial direction. Magnetic field 13 keeps the electron beam within its circular path. When an electron is between teeth 11, it is accelerated inwardly because there the field is stronger than necessary to keep the electron beam on a circular path. However, when the electron is between the gaps that separate teeth 11, the electron beam is accelerated outwardly because at that point the field is insufficiently strong to keep to that path. This results in an oscillation around the average circular trajectory. The wiggler radiation results from this oscillation which constitutes an acceleration. The synchrotron radiation results from centripetal acceleration necessary to keep the beam on a circular path. The frequency of the resulting wiggler radiation is then equal to the number of teeth, N, times the frequency of the synchrotron radiation because N tooth-gap pairs constitute N wiggles of the electron per circuit. FIG. 2B depicts an external view of toroid structure 10.

The wiggler and synchrotron radiation are both emitted tangentially from the toroidal azimuthal axis and they are both polarized in the toroid's principal plane, as described above. The present invention polarizes the two different radiation sources normal to each other. By polarizing the two different radiation sources normal to each other in a mutually orthogonal arrangement, then either one radiation or the other could be easily removed by a polarizing element such as an appropriate prism. Such an arrangement would permit the same magnetic field source to confine an electron beam to a circular path and provide lateral periodic motion for wiggler rotation. The present invention's polarization of two different radiation sources normal to each other in a mutual orthogonal arrangement provides monochromatic radiation sources for radars, communications, electronic warfare, medical diagnostics and so on References on toroidal and spherical magnetic structures include U.S. Pat. No. 5,486,802 "Spherical Magnet Structure And Use thereof In Synchrotron Radiation Source," and U.S. Pat. No. 5,716,469 "Spherical Magnet Having a Gap With a Periodically Varying Field For a Wiggler Radiation Source," which were issued to the inventor herein on Jan. 23, 1996 and Feb. 17, 1998, respectively.

SUMMARY OF THE INVENTION

It is an object of the present invention to provide a permanent magnet structure to polarize the wiggler and synchrotron radiation normal to each other.

It is an additional object of the present invention is to provide a permanent magnet structure to polarize the wiggler and synchrotron radiation sources normal to each other with a series of wedge-shaped magic ring sections forming a toroid having an equatorial gap extending about the periphery of the toroid.

These and other objects are advantageously accomplished with the present invention by constructing a toroid from a series of wedge-shaped magic ring sections in a way that polarizes the two wiggler and synchrotron radiation sources normal to each other in a mutually orthogonal fashion. This arrangement allows either one radiation or the other to be easily removed by a polarizing means such as an appropriate prism. Further, in accordance with the present invention, the magnetic field source can confine an electron beam to a circular path and provide lateral periodic motion for wiggler radiation.

DETAILED DESCRIPTION OF THE INVENTION

Figure 1:
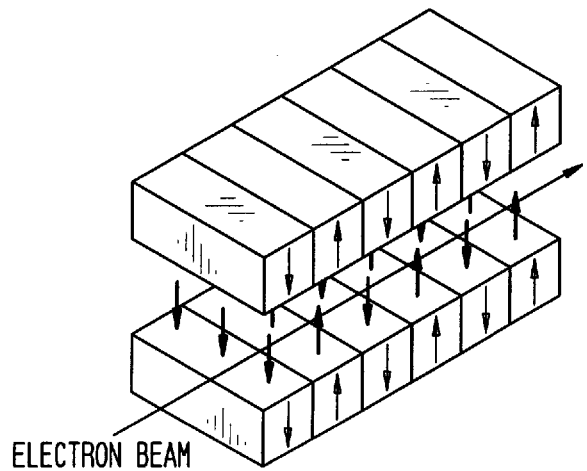
FIG. 1 is a simple prior art rectangular wiggler.
Figure 2A:
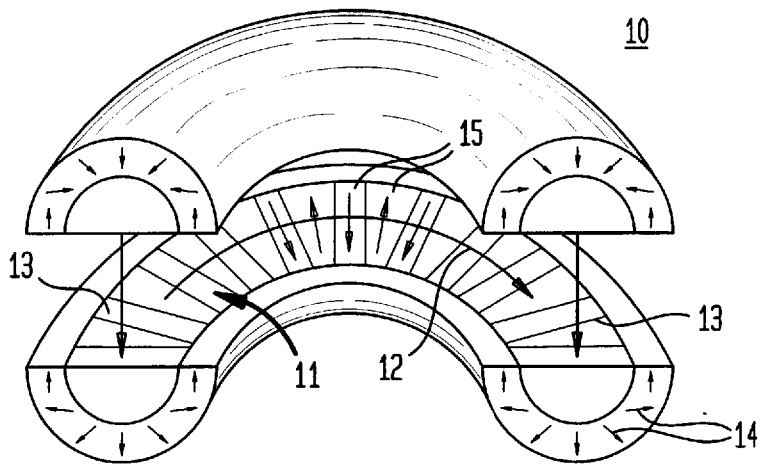
FIGS. 2A–2B are cut-away perspective views of a prior art toroidal magnetic structure.
Figure 2B:
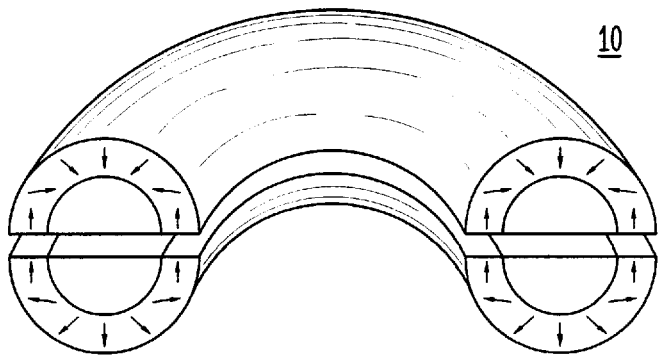
Figure 3:
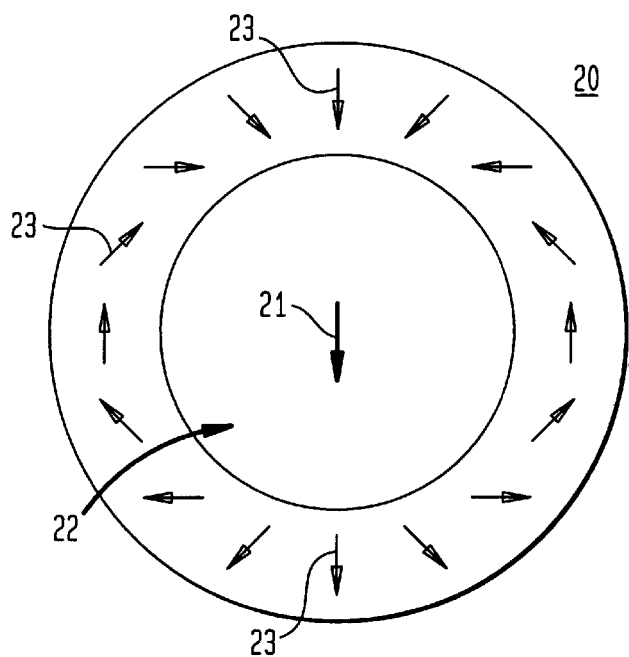
FIG. 3 is a cross sectional view of the magnetic field generated within one magic ring section.

FIGS. 1, 2A and 2B were previously described as part of the Background of the Invention. FIG. 3 is a cross sectional view of the magnetic flux flow generated within one magic ring section 20. FIG. 3 depicts the direction of the magnetic flux flow, indicated by large arrow 21, within a central hollow core 22 and smaller arrows 23 show the magnetization of the permanent magnet shell. A number of FIG. 3 magic ring sections 20 are combined to form the magnetic toroidal structure depicted in FIG. 4.

Magic rings 20, or cylinders, must always be made of high coercivity, high remanence materials such as samarium cobalt-5, samarium cobalt-17, or Neodymium ion-iron-boron materials. The magic rings must be rigid, meaning high coercivity, and strong, meaning high remanence.

Figure 4:
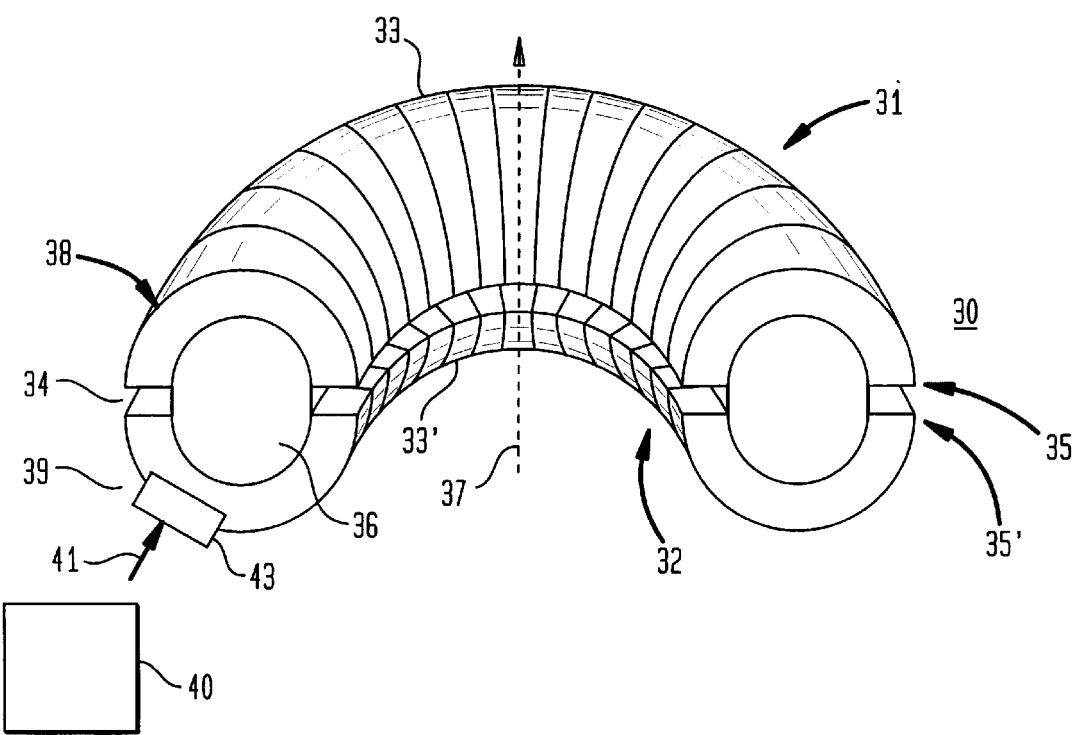
FIG. 4 is a perspective view of numerous wedge-shaped magic ring segments forming the toroid magnet structure of the present invention.
Figure 6:
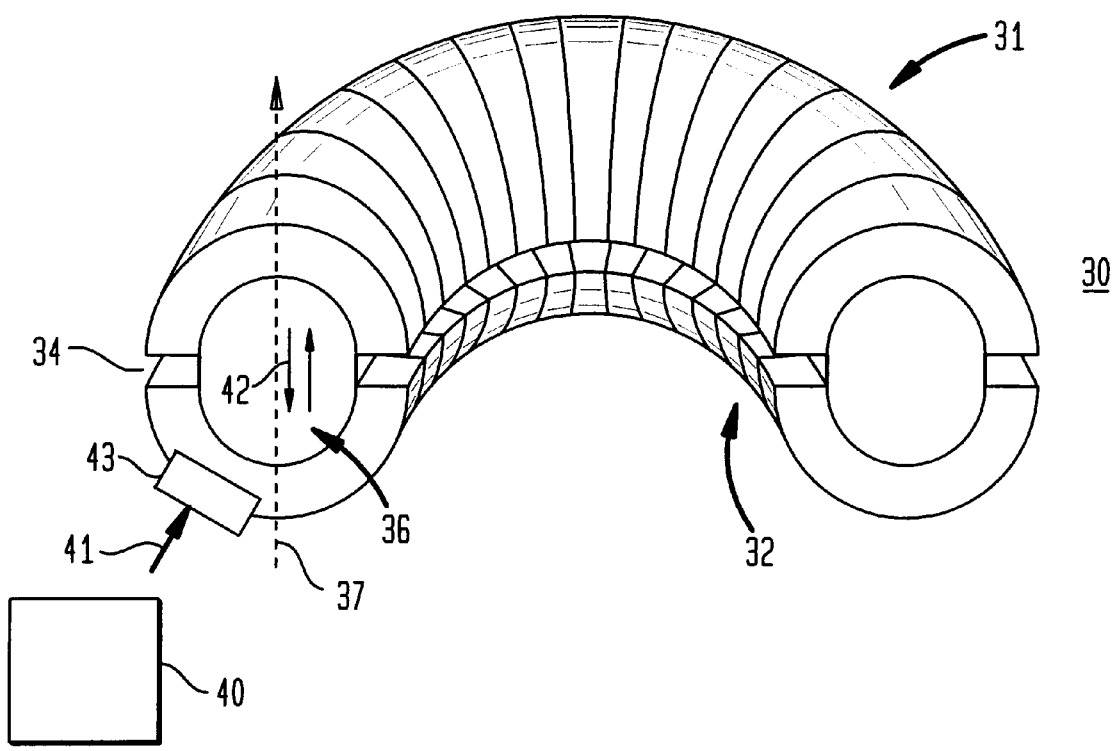
FIG. 6 is a perspective view of the magnetic forces within the central hollow core of the toroid magnet structure of the present invention.

Referring now to FIG. 4, which is the toroidal magnet structure 30 for polarizing a magnetic wiggler and a synchrotron normal. This structure comprises a toroid 30, which for ease of illustration is depicted as a pair of semi-toroids, 31 and 32, respectively, opposing each other and being composed of a plurality of magic ring semicircular segments 33 and 33', respectively, opposing each other. Equatorial slot 34 separates an outer surface 38 of semi-toroid 31 and an outer surface 39 of semi-toroid 32, extending about a periphery 35 and 35', respectively, of each semi-toroid 31 and 32. The opposing semi-toroids 31 and 32 define a central hollow core 36 and the toroid 30 has a toroidal axis, indicated by broken arrow 37, perpendicular to the semi-toroids 31 and 32, respectively. The term "opposing" as used herein refers to the semi-toroids being physically opposite, or facing, each other, and does not mean that they are magnetically opposite. The magic ring semicircular segments 33 and 33' are wedge-shaped to prevent magnetic flux leakage between segments and to form a continuous toroid 30. Equatorial slot 34 allows emission of radiation outside the toroid 30. An electron beam means 40 injects an electron beam 41 into said central hollow core 36. The magnetic flux elements of the present invention are depicted in FIG. 6 and will be described further below. It is within the contemplation of the present invention that toroid 30 can be assembled by either combining wedge-shaped magic rings 20 or opposing semi-toroids 31 and 31, respectively, composed of magic ring semicircular segments 33 and 33', respectively.

Figure 5A:
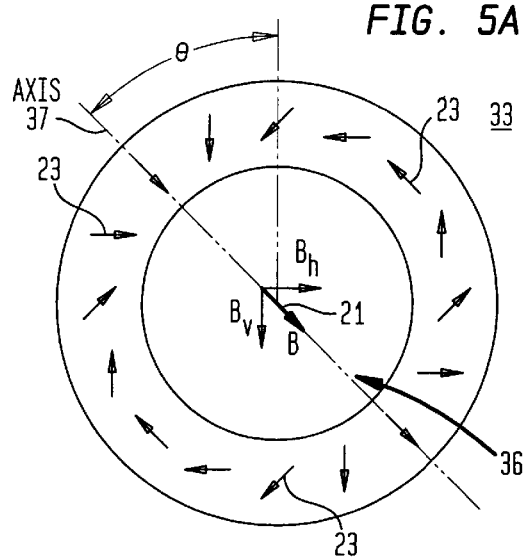
FIGS. 5A, 5B and 5C depict a sequential frontal view of the magnetic flux flow and electron flow path in three representative magic ring segments.
Figure 5B:
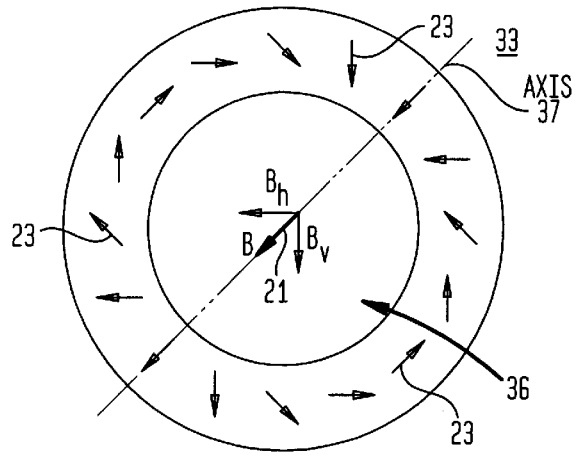
Figure 5C:
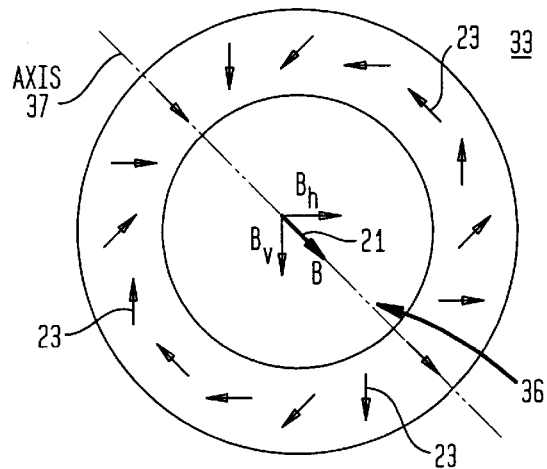

FIGS. 5A, 5B and 5C depict a sequential frontal view of the magnetic flux flow 21 and magnetization direction 23 in three successive FIG. 4 magic ring segments 33, using like reference numerals for similar structural elements including axis 37, but, for the sake of simplicity, without slot 34. In FIGS. 5A, 5B and 5C the magnetic field direction, indicated by large arrow 21, is shown as having the constant vertical component $B_v$ within the central hollow core 36, along with a periodic horizontal component $B_h$, alternating in direction from ring to ring in a sequence of three successive magic ring segments. The constant vertical component $B_v$ keeps the electron beam in a generally circular electron path around the toroid and is constant along the entire path. This drawing demonstrates that periodic horizontal component, $B_h$ alternates from FIGS. 5A to 5C, with the maximum horizontal component at the ring centers and no horizontal component at the boundary between rings 33. Periodic horizontal component, $B_h$, due to its periodicity, results in a vertical oscillation of the electron beam thereby giving rise to the wiggler radiation that is polarized vertically. The synchrotron radiation resulting from the electron beam's path around the toroid is polarized horizontally so that the two types of radiation are normal to each other, thereby accomplishing the purpose of the present invention. The electron beam generating means 40 (see FIG. 4) can be any electron beam source such as an electron beam gun. A polarizing means 43 can be placed in proximity to the toroid 30.

The relative strengths of $B_h$ and $B_v$ are set by the tilt angle θ of the section axis 37 from the vertical as shown in FIG. 5A. Then, $$B_v = B \cos\theta$$

$$B_h = B \sin\theta$$

$$\frac{B_h}{B_v} = \tan\theta$$

where B is the total field in the ring, indicated by arrow 21 of FIGS. 5A–5C. Constant vertical component $B_v$ is determined by the circumference of the electron beam path:

$$B_V = \frac{mV}{er}$$

where V, m and e are the velocity, mass and charge of the electron and r is the path radius in cgs units, then:

$$B_h = B_V \tan\theta = \frac{mV}{er}\tan\theta$$

The radiation's electric vector is parallel to the wiggler motion and hence perpendicular to the electric vector of the synchrotron radiation associated with the circular translational motion of the beam. Hence the two radiations (i.e. synchrotron and wiggler) can be separated. The ratio of $B_v$ to $B_h$ can be adjusted by a change in the orientation, angle θ, of the magic ring sections to the vertical plane, i.e. to the principal toroidal axis. In the FIG. 2 example, the ratio $B_v/B_h$ is +/−1, wherein the signs alter with progression to successive magic ring sections. The radiation is emitted tangentially through the outer perimeter of the slot 34 depicted in the FIG. 4 structure.

FIG. 6 is a perspective view of the magnetic forces within the central hollow core of the toroid magnet structure of the present invention, with like numerals for the same structural elements, including semi-toroid 31, semi-toroid 32 and equatorial slot 34. In this drawing, electron beam 41 has been injected from electron beam generating means 40 into hollow central core 36 of toroid 30, and toroidal axis 37 is shown bisecting central hollow core 36. The horizontal component $B_h$ of the magnetic field illustrated in FIGS. 5A to 5C, results in the vertical oscillation, indicated by arrows 42, of the electron beam 41 thereby giving rise to the wiggler radiation that is polarized vertically and is in a direction parallel to toroidal axis 37.

It will be understood that the embodiments described herein are merely exemplary and that a person skilled in the art may make many variations and modifications to the described embodiments utilizing functionally equivalent elements to those described. Any variations or modifications to the invention just described are intended to be included within the scope of said invention as defined by the appended claims.

What I claim is:

1. A polarizing toroidal magnet structure, comprising:
   a permanent magnet toroid, having an outer shell composed of a plurality of cylindrical rings;
   said toroid having an equatorial slot extending about a periphery of said outer shell, a central hollow core and a toroidal axis perpendicular to said toroid, provides a magnetic field within said core;
   said magnetic field having a constant vertical component $B_v$ and a periodic horizontal component $B_h$, said periodic horizontal component $B_h$ alternating in a horizontal direction with respect to said toroidal axis;
   said constant vertical component $B_v$ having an orientation parallel to said toroidal axis;
   an electron beam generating means injects an electron beam into said core, said electron beam generating synchrotron radiation having a circular electron path;
   said constant vertical component $B_v$ causing said electron beam to maintain said circular electron path;
   said plurality of cylindrical rings being wedge-shaped to minimize a leakage of magnetic flux from said core;
   a prism is placed in proximity to said toroid;
   said periodic horizontal component $B_h$, due to the periodicity of said component, causes said electron beam to wiggle about said circular path and emit a wiggling radiation within said core in a vertical direction parallel to said toroidal axis; and
   said synchrotron radiation is polarized in a horizontal direction perpendicular to said wiggling radiation, said wiggling radiation and said synchrotron radiation being mutually orthogonal, and said prism permits selectively eliminating said wiggling radiation or said synchrotron radiation.

2. The toroidal magnet structure, as recited in claim 1, further comprising said toroid being composed of a pair of opposing semi-toroids.

3. The toroidal magnet structure, as recited in claim 2, further comprising said pair of semi-toroids being composed of a plurality of magic ring semicircular segments opposing each other.

4. The toroidal magnet structure, as recited in claim 3, further comprising each of said plurality of magic ring semicircular segments being wedge-shaped.

5. The toroidal magnet structure, as recited in claim 3, further comprising said equatorial slot separates an outer surface of each of said pair of semi-toroids and extending about a periphery of each of said pair of semi-toroids.

6. The toroidal magnet structure, as recited in claim 5, further comprising each of said pair of semi-toroids having an interior surface defining said core.

7. The toroidal magnet structure, as recited in claim 1, further comprising said wiggling radiation oscillating up and down parallel to said toroidal axis within said core.

8. The toroidal magnet structure, as recited in claim 7, further comprising said plurality of cylindrical rings being wedge-shaped provides a continuous toroid.

9. The toroidal magnet structure, as recited in claim 8, further comprising each of said plurality of cylindrical rings having a circular magnetic orientation.

10. The toroidal magnet structure, as recited in claim 9, further comprising said electron beam generating means being an electron beam source.

11. The toroidal magnet structure, as recited in claim 10, further comprising said electron beam source being an electron beam gun.

12. The toroidal magnet structure, as recited in claim 11, further comprising having a magnetic strength for said constant vertical component $B_v$ according to the formula:

$$B_v = B \cos \theta$$

where said B represents a magnetic strength for said magnetic field.

13. The toroidal magnet structure, as recited in claim 12, further comprising having a magnetic strength for said periodic horizontal component $B_h$ according to the formula:

$$B_h = B \sin \theta$$

14. The toroidal magnet structure, as recited in claim 13, further comprising having a relative strength value for said periodic horizontal component $B_h$ and said constant vertical component $B_v$ being set by a tilt angle θ from the vertical direction of said toroidal axis according to the formula:

$$\frac{B_h}{B_V} = \tan\theta.$$

15. The toroidal magnet structure, as recited in claim 14, further comprising having said periodic horizontal component $B_h$ according to the formula:

$$B_h = B_V \tan\theta = \frac{mV}{er}\tan\theta$$

where V, m and e are the velocity, mass and charge of an electron, respectively, and r is the circular electron path radius in cgs units.

16. The toroidal magnet structure, as recited in claim 15, further comprising adjusting said ratio by altering the orientation of angle θ of said plurality of cylindrical rings relative to a vertical plane of said toroidal axis.

17. The toroidal magnet structure, as recited in claim 16, further comprising said constant vertical component $B_v$ and said periodic horizontal component $B_h$ being in a ratio of −1.

18. The toroidal magnet structure, as recited in claim 17, further comprising:

said equatorial slot emitting said synchrotron radiation outside said toroid;

said plurality of cylindrical rings being a first set cylindrical rings and a second set of cylindrical rings; and said periodic horizontal component $B_h$ causing said magnetic field direction to alternate from said first set cylindrical rings to said second set of cylindrical rings.

\* \* \* \* \*